(12) United States Patent
Dannoux et al.

(10) Patent No.: US 7,434,513 B2
(45) Date of Patent: Oct. 14, 2008

(54) FLEXIBLE HIGH DENSITY ARRAY PRINT HEAD WITH SYSTEMS AND METHODS FOR ALIGNING PIN PLATE, RESERVOIR AND SUBSTRATE WITH RESPECT TO EACH OTHER

(75) Inventors: Thierry L. A. Dannoux, Avon (FR); Jean-Pierre Lereboullet, Paris (FR); Romain Ramel, Fontainebleau (FR); Xavier Tellier, Vilecerf (FR)

(73) Assignee: Corning Incorporated, Corning, NY (US)

( * ) Notice: Subject to any disclaimer, the term of this patent is extended or adjusted under 35 U.S.C. 154(b) by 979 days.

(21) Appl. No.: 10/848,878

(22) Filed: May 19, 2004

(65) Prior Publication Data
US 2004/0226471 A1    Nov. 18, 2004

Related U.S. Application Data

(62) Division of application No. 10/143,052, filed on May 10, 2002, now Pat. No. 6,755,131.

(30) Foreign Application Priority Data
Dec. 31, 2001  (EP) .................................. 01403393

(51) Int. Cl.
B41L 1/02 (2006.01)
G01N 35/10 (2006.01)
B07B 13/00 (2006.01)

(52) U.S. Cl. .................... 101/485; 436/43; 436/180; 422/63; 422/100; 209/41; 209/45

(58) Field of Classification Search ................ 422/100, 422/63–67, 68.1; 436/43, 180; 101/485; 209/41, 45
See application file for complete search history.

(56) References Cited

U.S. PATENT DOCUMENTS

| | | | |
|---|---|---|---|
| 4,511,534 A | 4/1985 | Bennett, Jr. et al. | 422/100 |
| 6,040,193 A | 3/2000 | Winkler et al. | 436/80 |
| 6,136,269 A | 10/2000 | Winkler et al. | 422/61 |
| 6,309,891 B1 | 10/2001 | Shalon et al. | 436/180 |
| 6,376,256 B1 * | 4/2002 | Dunnington et al. | 506/30 |
| 6,565,813 B1 * | 5/2003 | Garyantes | 422/102 |
| 6,596,237 B1 | 7/2003 | Borrelli et al. | 422/100 |
| 6,686,207 B2 * | 2/2004 | Tupper et al. | 436/174 |
| 6,887,431 B1 * | 5/2005 | Vann et al. | 506/43 |
| 7,347,975 B2 * | 3/2008 | Vann et al. | 422/100 |

(Continued)

Primary Examiner—Brian R. Gordon
(74) Attorney, Agent, or Firm—Thomas R. Beall; William J. Tucker

(57) ABSTRACT

Systems and methods for aligning High Density Array ("HDA") pin plates, substrates and reservoirs with respect to each other. The system includes a flexure having a flexible print head, elongated members flexibly connected off-axis to the system and a pin plate support assembly detachably connected to the flexure allowing the pin plate assembly to adapt its position during a printing operation. The pin plate has alignment ball receptacles on its surface and the reservoir has alignment balls on its surface facing the pin plate. The pin plate is positioned with respect to the reservoir such that each of the alignment balls is located within one of the alignment ball receptacles to achieve the alignment. Once the pin plate is aligned, it is secured to a supporting assembly such as a vacuum bridge, and inking and printing operations are performed.

9 Claims, 13 Drawing Sheets

U.S. PATENT DOCUMENTS

| | | | |
|---|---|---|---|
| 2002/0001546 A1 | 1/2002 | Hunter et al. | 422/102 |
| 2002/0015666 A1* | 2/2002 | Vann et al. | 422/100 |
| 2002/0083998 A1 | 7/2002 | Overbeck et al. | 141/279 |
| 2002/0094578 A1 | 7/2002 | Kowallis et al. | 436/43 |
| 2003/0015807 A1 | 1/2003 | Montemagno et al. | 257/798 |
| 2003/0021734 A1* | 1/2003 | Vann et al. | 422/100 |
| 2003/0124599 A1 | 7/2003 | Chen et al. | 435/6 |
| 2003/0124716 A1 | 7/2003 | Hess et al. | 435/287.1 |
| 2003/0124735 A1 | 7/2003 | Nanthakumar et al. | 436/80 |
| 2005/0130318 A1* | 6/2005 | Vann et al. | 436/180 |
| 2006/0018796 A1* | 1/2006 | Sitte | 422/100 |

* cited by examiner

FLEXIBLE HIGH DENSITY ARRAY PRINT HEAD WITH SYSTEMS AND METHODS FOR ALIGNING PIN PLATE, RESERVOIR AND SUBSTRATE WITH RESPECT TO EACH OTHER

RELATED APPLICATIONS

This is a divisional of U.S. patent application Ser. No. 10/143,052 now U.S. Pat. No. 6,755,131 filed May 10, 2002. This Application claims the benefit of French Patent Application No. 01 403 393.0, filed on Dec. 31, 2001, in the names of Thierry L. A. Dannoux, Jean-Pierre Lereboullet, Ramain Ramel and Xavier Tellier, the entire content of which is incorporated herein by reference.

FIELD OF THE INVENTION

The invention is related generally to high density array ("HDA") inking and printing and, more particularly, to a flexible HDA print head with systems for HDA pin plate alignment with respect to a reservoir for performing inking operations and systems for substrate alignment with respect to an HDA pin plate for performing printing operations.

BACKGROUND OF THE INVENTION

HDAs of DNA or Oligonucleotides have many applications in the biological fields such as genetic research or diagnostic purposes. Conventional HDAs may have well over hundreds or thousands of different compounds (e.g., DNA, oligonucleotides, proteins, etc.) typically deposited on the surface of a substrate (e.g., a glass slide) in an array configuration.

Performing HDA inking and printing operations require a conventional HDA print head and its components to perform many repeatable motions, typically in the range of several million with a traveling distance in the range of 2 to 5 mm. A desirable range of accuracy and repeatability for conventional HDA print heads and their components should be within the range of +/−2 µm. In addition, the movements of the conventional HDA print head and its components should ideally be smooth. Utilizing precision ball raceways in a conventional HDA print head to attempt achieving such accuracy and repeatability is not a viable solution due to the prospective effects of local wear and brinelling.

Some conventional HDA print heads, such as a compound double bridge print head mechanism, have attempted to address the above-noted issues. However, these conventional HDA print heads are heavy and often involve a complex and costly manufacturing process. Moreover, their heavy weight may make them difficult to use. Referring to FIG. 1, a conventional HDA print head mechanism 10 having a conventional flexure 12 is shown. One of the disadvantages of the conventional HDA print head mechanism 10 includes having a large orthogonal displacement $\Delta$, where $\Delta = 1(1-\cos \alpha)$ and $h = 1(\sin \alpha)$. Having a large orthogonal displacement $\Delta$ increases the likelihood that a conventional HDA pin plate (not illustrated) situated within the conventional HDA print head mechanism 10 will become misaligned with respect to a conventional HDA reservoir structure 14 or a printing substrate (not illustrated) while inking and printing operations are performed. Such misalignments may damage the HDA print head mechanism 10, conventional HDA reservoir structure 14 or the printing substrate.

Referring to FIG. 2, a conventional HDA reservoir structure 14 and conventional HDA pin plate 16 are illustrated. Conventional HDA reservoir structure 14 includes conventional capillaries 18 having openings thereto on the conventional HDA reservoir top surface 15 facing conventional HDA pin plate 16. Conventional HDA pin plate 14 includes conventional pins 20 arranged in a pattern, which enter conventional capillaries 18 to pick up liquid materials 22 to subsequently transfer to a printing substrate (not illustrated).

Referring to FIGS. 3-5, an inking and a printing operation using conventional HDA pin plate 16 for transferring liquid materials 22 from conventional HDA reservoir structure 14 to a slide 24 will be described. The inking and printing operations ought to be performed within a short period of time of each other. Referring to FIG. 3, an inking operation includes using conventional HDA pin plate 16 to pick up liquid materials 22 from conventional HDA reservoir structure 14. Each of the conventional pins 20 must be positioned initially over a center of an opening of each conventional capillary 14. Achieving precise transfers of liquid materials 22 from conventional HDA reservoir structure 14 to each conventional pin 20 requires moving and/or positioning conventional HDA pin plate 16 to achieve and maintain a parallel orientation with respect to conventional HDA reservoir structure 14 throughout the inking operation.

It is important that conventional HDA pin plate 16 achieves and maintains a parallel alignment with respect to conventional HDA reservoir structure 14 because the internal linings or walls of the conventional capillaries 18 are typically thin, varying in thickness from 25 to 30 µm. A misalignment during an inking operation could cause conventional pins 20 to come into contact with the internal linings or walls of the conventional capillaries 18 and damage the conventional pins 20 and/or conventional capillaries 18, potentially costing thousands of dollars to replace. Conventional HDA pin plate 16 is lowered towards conventional HDA reservoir structure 14 until each conventional pin 20 enters its corresponding conventional capillary 18 and contacts liquid materials 22 held therein. Once each conventional pin 20 makes contact with liquid materials 22, conventional HDA pin plate 16 is retracted upwards and away from conventional HDA reservoir structure 14, and a reproducible portion of liquid material 22 is collected by each conventional pin 20.

Referring to FIG. 4, a printing operation includes using conventional HDA pin plate 16 to transfer liquid materials 22 to slide 24. Conventional HDA pin plate 16 is lowered until each conventional pin 20 is close enough for the liquid materials 22 to make contact with slide 24. Conventional HDA pin plate 16 must achieve and maintain a parallel alignment with respect to slide 24 throughout the printing operation to avoid damage, since the conventional pins 20 must not make direct contact with slide 24. Slides 24 are manufactured out of a glass material approximately 1 mm thick. A misalignment could cause some of the conventional pins 20 to come into contact with slide 24 before other conventional pins 20 are close enough to deposit liquid materials 22, resulting in damaging conventional pins 20. Further, remnants of damaged conventional pins 20 could contaminate the liquid materials 22 and damage the internal linings or walls of the conventional capillaries 18 during subsequent inking operations. Again, the damage could result in costing thousands of dollars since the liquid materials 22 are often expensive. Once all the liquid materials 22 are transferred to slide 24, conventional HDA pin plate 16 is retracted upwards away from slide 24.

Previously, a manual, five-axis and one radial micromanipulation has been needed to align conventional HDA pin plates 16 with respect to conventional HDA reservoir structures 14 to perform accurate and precise inking and printing operations and to avoid the types of damage mentioned above. To perform such a micromanipulation, conventional HDA pin plate 16 and conventional HDA reservoir structure 14 are situated within a conventional print head such as the conventional HDA print head mechanism 10 mentioned above with respect to FIG. 1. Such a conventional print head secures the conventional HDA reservoir structure 14, and eventually the slide 24, to allow the conventional HDA pin plate 16 to be moved and/or positioned during the micromanipulation before performing inking and printing operations.

Referring to FIG. 5, micromanipulation for alignment purposes involves moving and/or positioning conventional HDA pin plate 16 along the X and Y axis and the θ radius to achieve planar superposition with respect to the conventional HDA reservoir structure 14. The conventional HDA pin plate 16 is moved and/or positioned in the direction of the α and β axis to achieve spatial orientation with respect to conventional HDA reservoir structure 14. To determine whether conventional HDA pin plate 16 is oriented parallel with respect to conventional HDA reservoir structure 14, conventional HDA pin plate 16 may be visually observed to determine whether each conventional pin 20 has entered each corresponding conventional capillary 18 of conventional HDA reservoir structure 14. Referring back to FIG. 3, the micromanipulation with regard to the X and Y axis and the θ radius is accomplished by observing the crossed stages of the X and Y axis and the θ radius with respect to each conventional pin 20 and the meniscus level of liquid materials 22 present in each conventional capillary 18, assuming conventional pins 20 are at least partially transparent.

The micromanipulation with regard to the α and β axis can be very difficult to perform since it often undermines the micromanipulation with regard to the X and Y axis and the θ radius, as well as for other reasons. For instance, each time an inking and printing operation is performed, conventional HDA pin plate 16 must be replaced in the conventional print head by a fresh conventional HDA pin plate 16. Thus, several conventional HDA pin plates 16 are typically prepared prior to performing inking and printing operations, depending upon the number of slides 24 expected to be printed on, requiring the above-described micromanipulation to be performed for each one. Moreover, performing the above-described micromanipulation process typically takes at least one hour per conventional HDA pin plate 16. Further, the removal and installation of conventional HDA pin plates 16 from conventional print heads often require special tools. Therefore, it is rather time consuming and difficult to install and remove conventional HDA pin plates 16 from conventional print heads. Moreover, aligning conventional HDA pin plates 16 with respect to conventional HDA reservoir structures 14 is also time consuming and tedious.

Furthermore, conventional HDA pin plates 16 are vulnerable to damage resulting from misalignments during the inking and/or printing operations as mentioned above. Thus, additional conventional HDA pin plates 16 are typically prepared prior to performing inking and printing operations since it would be undesirable to halt operation of the conventional pin heads for the at least one hour needed to prepare a replacement conventional HDA pin plate 16 by performing a tedious micromanipulation each time a conventional HDA pin plate 16 was damaged. Typically, at least ten more additional conventional HDA pin plates 16 than are actually needed are prepared prior to performing inking and printing operations.

SUMMARY OF THE INVENTION

A method for aligning a pin plate with respect to a reservoir in accordance with one embodiment of the present invention includes several steps. The method includes providing the pin plate with a plurality of object receptacles on its surface and placing a plurality of objects on the reservoir's top surface facing the pin plate. The pin plate is positioned with respect to the reservoir such that each of the objects is located at least partially within one of the object cavities. Once the pin plate is aligned with respect to the reservoir, the pin plate is secured to a supporting assembly.

An alignment system for a pin plate in accordance with another embodiment of the present invention includes a pin plate base having a plurality of object receptacles on its surface, a reservoir having a plurality of cells each having an opening on the top surface of the reservoir facing the pin plate and a plurality of objects located on the reservoir's top surface. The alignment system also includes a micromanipulator that positions the pin plate with respect to the reservoir such that each of the objects is located at least partially within one of the object cavities.

A pin plate for printing high density arrays in accordance with another embodiment of the present invention includes a pin plate base with at least one surface, a plurality of first extensions projecting away from the surface of the pin plate base and a plurality of object receptacles on the pin plate base's surface.

A method of manufacturing a pin plate for printing high density arrays in accordance with another embodiment of the present invention includes forming a plurality of first extensions that project away from the surface of a pin plate base and forming a plurality of object receptacles on the pin plate base's surface.

A reservoir for use in printing high density arrays in accordance with another embodiment of the present invention includes a reservoir structure with at least one surface, a plurality of cells that extend through the reservoir structure to openings along a surface of the reservoir structure and a plurality of objects on the reservoir structure's surface.

A method of manufacturing a self aligning reservoir for printing high density arrays in accordance with another embodiment of the present invention includes several steps. In particular, the method includes providing a reservoir structure with a plurality of cells that extend through the reservoir structure to openings along a surface of the reservoir structure.

A flexible print head system in accordance with another embodiment of the present invention includes a flexure, a print head and a plurality of flexible members connecting at least one elongated member to the flexure and to the print head, where the flexible members are machined off-axis causing the print head to move a substantially equal distance along a Z axis to perform either an inking or a printing operation.

A pin plate assembly capable of maintaining alignment with respect to a printing substrate in accordance with another embodiment of the present invention includes a pin plate connected to a pin plate support, where the pin plate support is removably connected to a flexure and detaches from the flexure during a printing operation when the printing substrate contacts the pin plate and forces the pin plate upwards along a Z axis.

A system for aligning a substrate in a printing device in accordance with another embodiment of the present invention includes a mirror assembly having a mirror connected to a top surface of a plurality of objects attached to a top surface of a reservoir structure, where the objects were used for aligning a pin plate, a substrate securing system that holds a substrate in a fixed position within the printing device, a laser system that generates a first laser beam and a second laser beam, the first laser beam reflecting off the mirror towards a non-reflective surface to create a reference point on the surface, and the second laser beam reflecting off the substrate towards the surface, the mirror being replaced by the substrate after the first laser beam is generated, and a substrate orientation system that adjusts the orientation of the substrate until the second laser beam converges upon the reference point on the surface.

A method for aligning a substrate in a printing device in accordance with another embodiment of the present invention includes several steps. In particular, the method includes placing a mirror on a top surface of a plurality of objects attached to a top surface of a reservoir structure, where the objects were used for aligning a pin plate, reflecting a first laser beam off the mirror towards a non-reflective surface to create a reference point on the surface, replacing the mirror with the substrate, reflecting a second laser beam off the substrate towards the surface, and adjusting the orientation of the substrate until the second laser beam converges upon the reference point on the surface.

One of the advantages of the present invention is that pin plates can be accurately, economically and swiftly aligned with reservoir structures arranged within print head mechanisms prior to performing printing and inking operations. Moreover, the present invention is easily used and maintained while not requiring that a complex and tedious micromanipulation of each axis individually to align pin plates with reservoir structures.

An additional advantage of the present invention is that the flexible print head mechanism is able to withstand many repeatable motions while maintaining a high degree of accuracy and repeatability along with a smooth operation. Moreover, the flexible print head mechanism has the additional advantage of having a reduced orthogonal displacement Δ without increasing the mechanism's weight and cost or requiring a complex assembly process. Furthermore, an additional advantage of the present invention is that the flexible print head mechanism's components bear relatively equal stress levels throughout inking and printing operations so as to reduce the overall stress level on the components.

Yet another advantage of the present invention is a detachable pin plate assembly that allows a pin plate to adapt its orientation during a printing operation to ensure that the pin plate remains aligned with a substrate being printed on throughout the operation. Moreover, substrates being printed on are held in a proper position by a vacuum bridge. In addition, another advantage is a pin plate assembly that is easily removable from a print head mechanism.

DETAILED DESCRIPTION OF THE INVENTION

Figure 1:
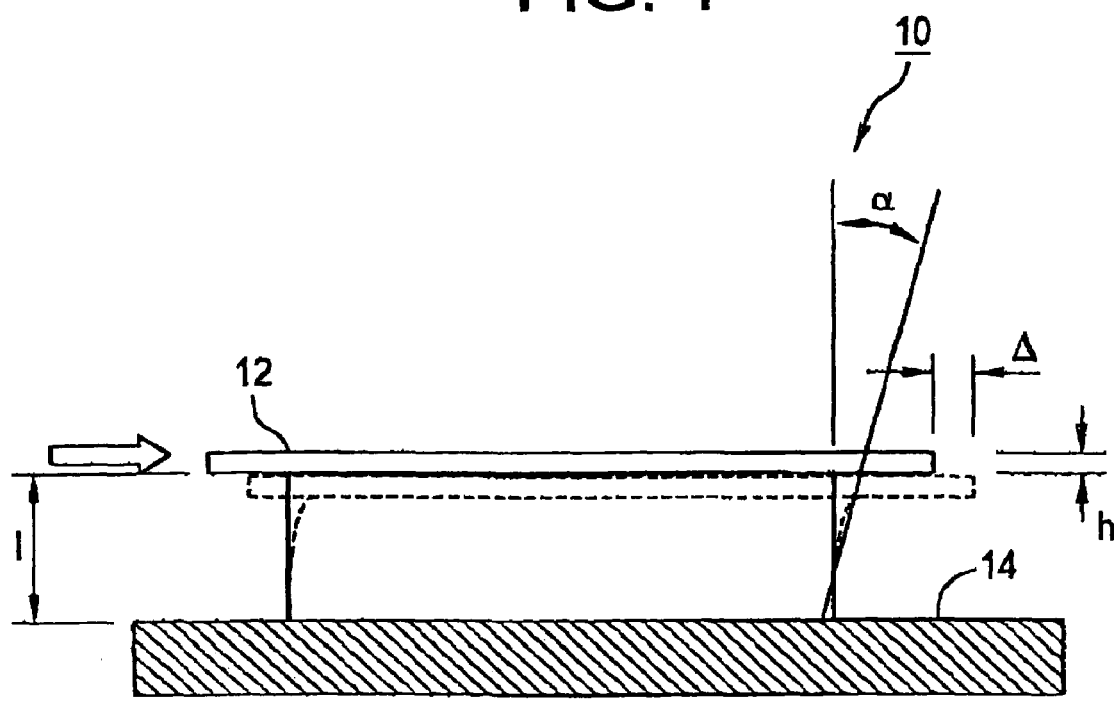
FIG. 1 is a side view of a conventional flexure architecture.
Figure 2:
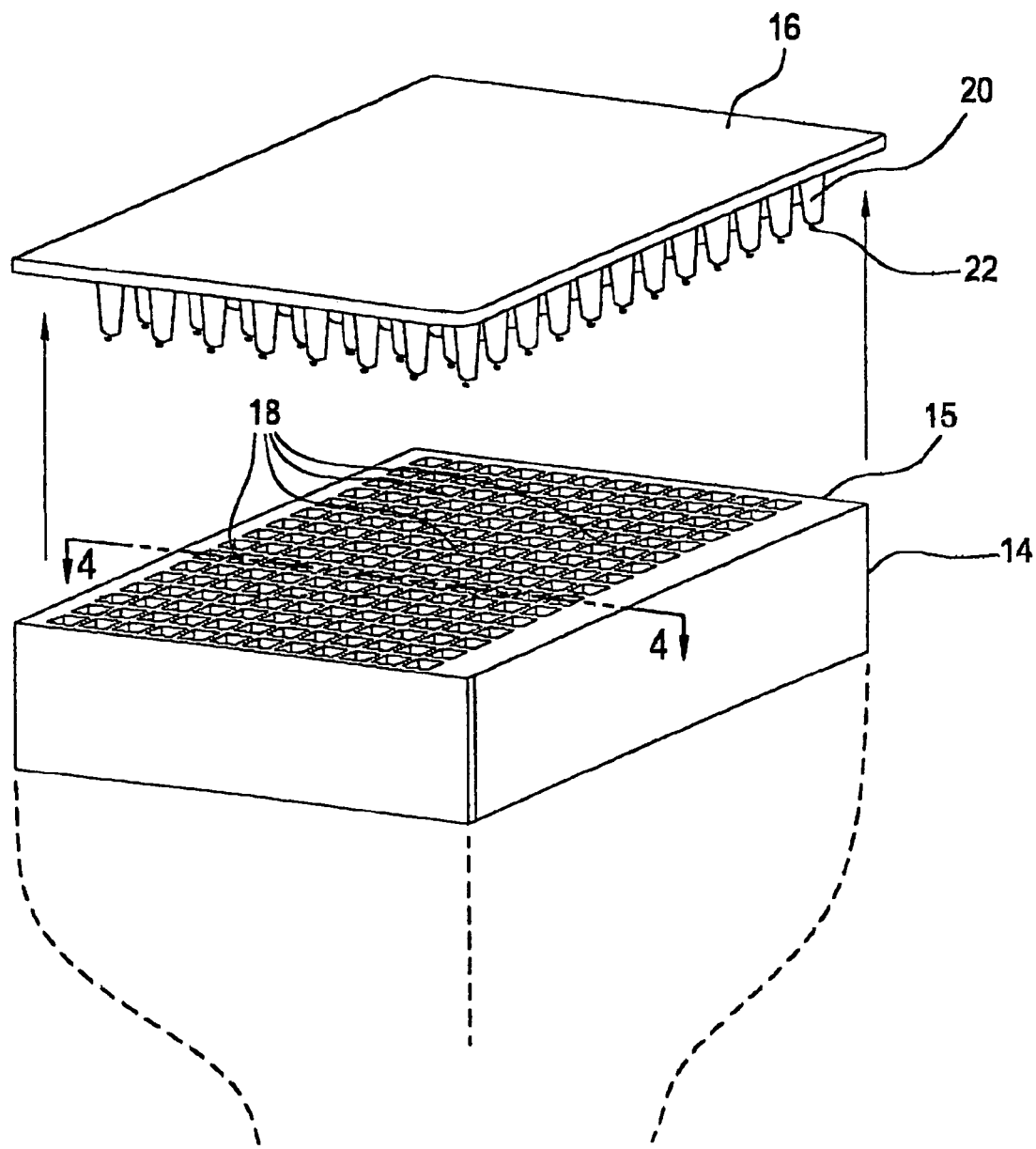
FIG. 2 is a perspective view of a conventional pin plate positioned over a conventional reservoir structure.
Figure 3:
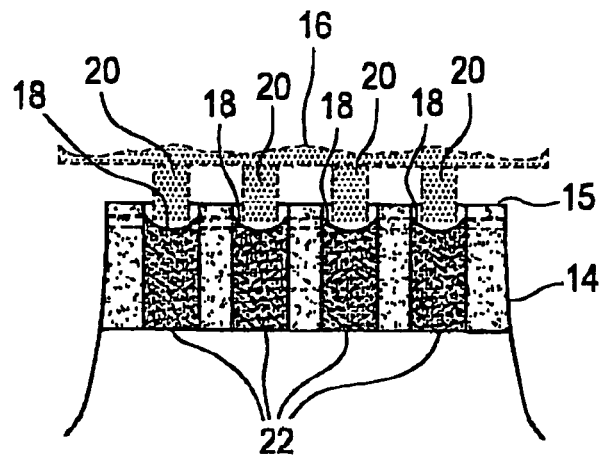
FIG. 3 is a cross-sectional diagram showing exemplary pin plate pins penetrating reservoir capillaries.
Figure 4:
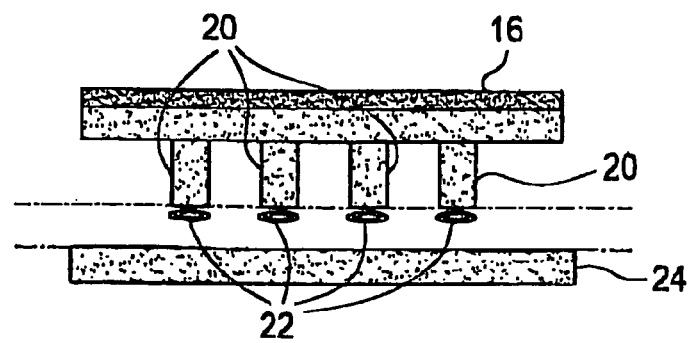
FIG. 4 is a diagram of a pin plate positioned over a slide prior to performing a printing operation.
Figure 5:
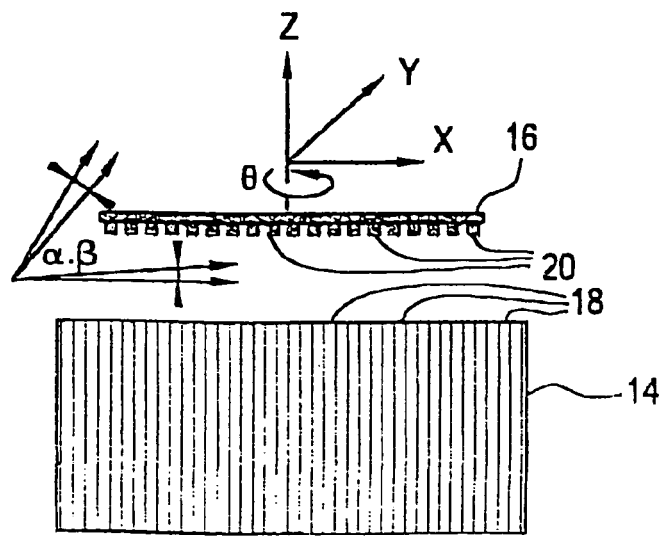
FIG. 5 is a diagram of a conventional six-axis micromanipulation of a pin plate with respect to a reservoir structure.
Figure 6:
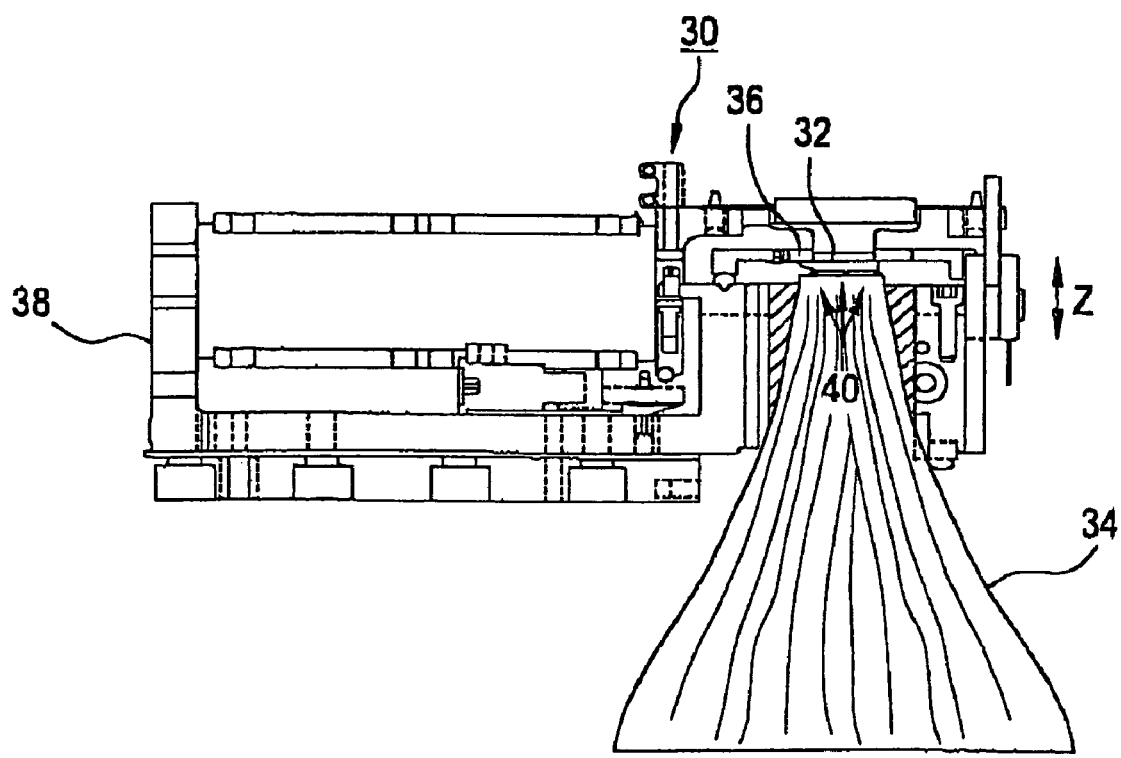
FIG. 6 is a side view of a print head system in accordance with one embodiment of the present invention.

An HDA print head system 30 for aligning pin plate 32 with respect to reservoir structure 34 in accordance with one embodiment of the present invention is illustrated in FIG. 6. HDA print head system 30 comprises reservoir structure 34, aligned pin plate assembly 36, flexure 38 and balls 40. HDA print head system 30 has a number of features, including the ability to accurately, economically and swiftly ensure and maintain alignment of pin plate 32 with respect to reservoir structure 34 during inking operations. In addition, HDA print head system 30 is able to withstand many repeatable motions while maintaining a high degree of accuracy and repeatability along with a smooth operation. Moreover, the HDA print head system 30 has the additional advantage of having a reduced orthogonal displacement Δ without increasing its weight and cost or requiring a complex assembly process. An additional advantage of HDA print head system 30 is that its structures bear relatively equal stress levels throughout inking and printing operations so as to reduce the overall stress level on HDA print head system 30 to ensure proper operation.

Figure 7:
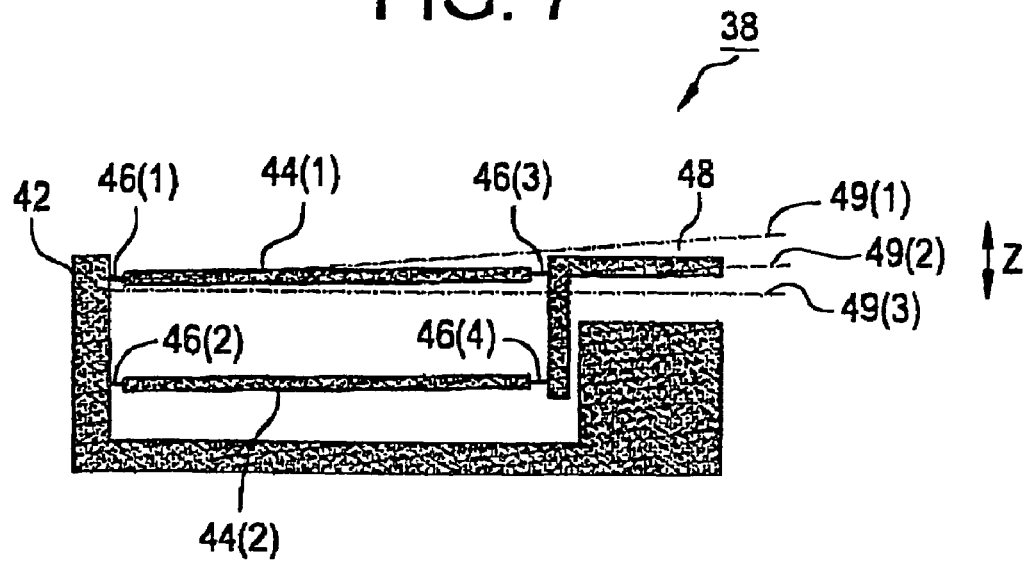
FIG. 7 is a diagram of the flexure architecture of the print head system.

Referring to FIG. 7, the flexure 38 of HDA print head system 30 will now be described in accordance with one embodiment of the present invention. Flexure 38 includes flexure base 42, which is connected to elongated members 44(1)-44(2) by flexible members 46(1)-46(2). Print head 48 is connected to elongated members 44(1)-44(2) by flexible members 46(1)-46(2). Each flexible member 46(1)-46(4) has a length ranging from about 60 to 120 mm, which results in an orthogonal displacement Δ with respect to pin plate 32 during inking and printing operations being no greater than about 1.2 to 2.4 μm. Thus, as the print head 48 is pushed downward along the Z axis by a micromanipulator, described further herein below, the reduced orthogonal displacement Δ results in decreasing the amount of misalignment between pin plate 32 and reservoir structure 34 during inking operations or a slide 24 during printing operations.

In this embodiment, flexure 38 is formed out of titanium since it is light weight, highly resistant to corrosion, has a high degree of elasticity and is not highly magnetic, although other materials such as aluminum alloys, spring steels or stainless steels may be used to form flexure 38. Moreover, flexure 38 and its structures including flexure base 42, elongated members 44(1)-44(2), flexible members 46(1)-46(4) and print head 48 are machined into one monolithic structure formed from one piece of raw material and are thus integral with respect to each other, although in other embodiments flexure 38 and its structures are not integral and are thus connected to each other by welding, epoxies or mechanical fasteners such as screws, for example.

Wire electrical discharge machining ("EDM") processes are employed to form flexure 38, although other machining processes may be employed such as extrusion, grinding or etching depending upon a number of factors such as the raw material used to form flexure 38. Using an EDM process enables flexure 38 to have a compact and light design, weighing no more than about 100 grammes for the moving part. In addition, employing an EDM process for manufacturing flexure 38 reduces overall production costs.

In this embodiment, print head 48, flexible members 46(3)-46(4) and elongated members 44(1)-44(2) are connected in an off-axis position 49(2) to flexure base 42 when the print head 48 is in a resting position to minimize the overall stress level of the structures in flexure 38 during inking and printing operations. Minimizing the stress level of the structures in flexure 38 reduces the overall wear and tear on flexure 38. In particular, the stress amplitude of the structures in flexure 38 is substantially equal whether print head 48 is in a printing position 49(1) or an inking position 49(3) since the print head 48 moves an equal distance of about 3 mm along the Z axis towards the printing position 49(1) or the inking position 49(3) from the off-axis position 49(2), although the print head 48 may move a lesser or greater distance.

Flexure 38 is formed so that print head 48 is positioned in a zero lateral displacement zone when flexible members 46(1)-46(4) flex or bend to allow print head 48 to conform to an inking position 49(2) when print head 48 is pushed downward along the Z axis by a micromanipulator. When print head 48 conforms to the inking position 49(2), and thus is in the zero lateral displacement zone 90, pin plate 32 is able to achieve a high degree of alignment with respect to reservoir structure 34 during an inking operation.

Pin Plate

Figure 8:
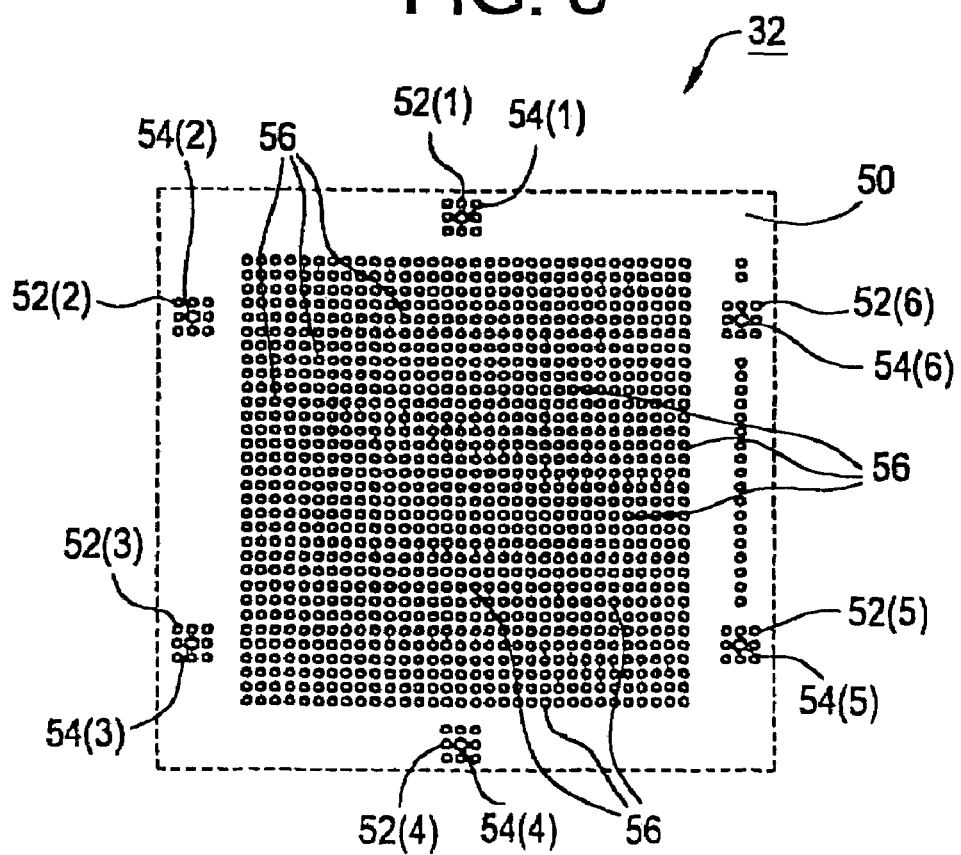
FIG. 8 is a top view of a pin plate used in the print head system.
Figure 9:
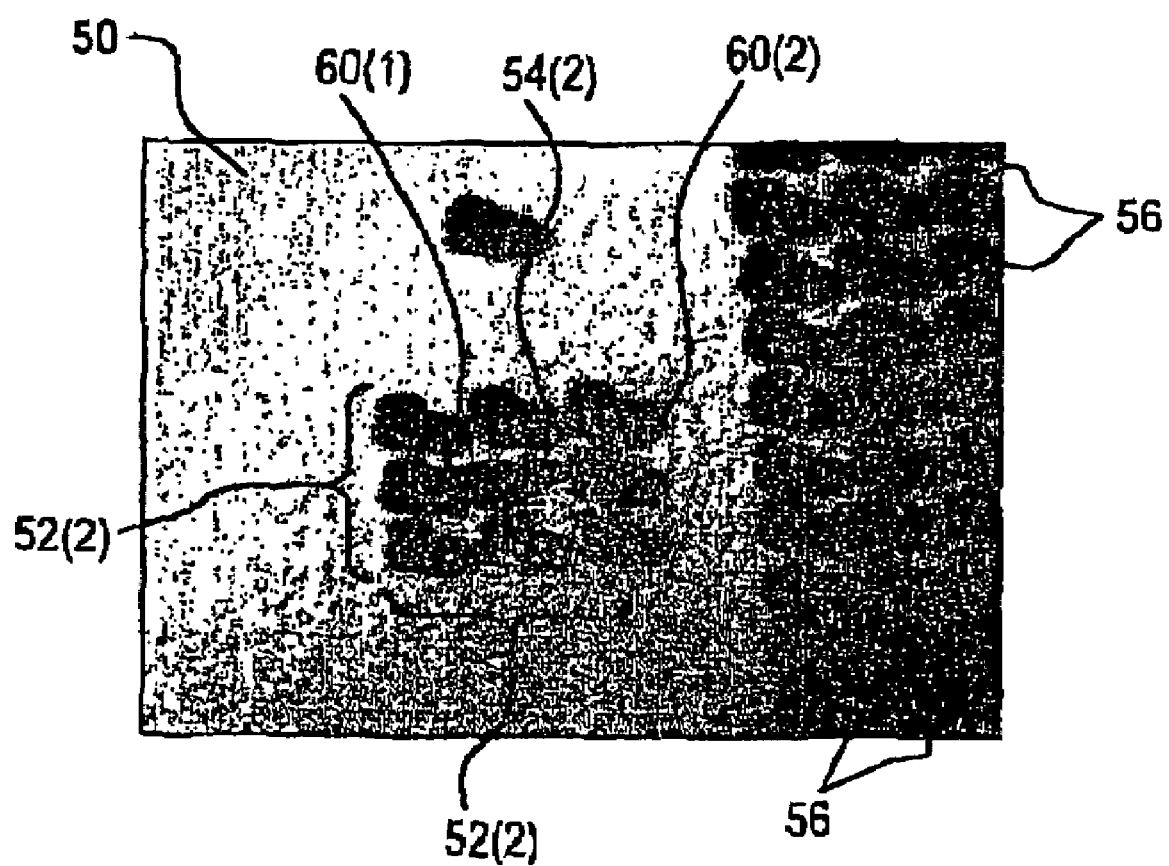
FIG. 9 is an enlarged perspective view of an alignment structure on the pin plate in FIG. 8.

Referring to generally to FIGS. 8-9, pin plate 32 of HDA print head system 30 will now be described in accordance with another embodiment of the present invention. In this embodiment, pin plate 32 comprises alignment structures 52(1)-52(6) each having a corresponding alignment cavity 54(1)-54(6), and pins 56. Pin plate 32 is formed out of Fotoform® micro-engravable glass, manufactured by Corning Inc., by employing a photolithography process, although pin plate 32 may be formed out of a number of other materials including silica using other methods such as reactive ion etched or ICP. In this embodiment, pins 56 each have a diameter of about 100 μm and a length of about 120 μm when measured from the top of each pin 56 to the base of each pin 56 at the planar surface 50 of pin plate 32, although their diameter and length may vary in the range of 0.0-0.7 μm. Pins 56 extend outwardly and away from the planar surface 50 of pin plate 32 and are arranged in a 32 by 32 array or matrix pattern comprising a total of 1,024 pins 56, although pins 56 may be arranged in a number of other patterns and may comprise a lesser or greater total number of pins 56.

Alignment structures 52(1)-52(6) form two sets comprising alignment structures 52(1), 52(3), 52(5) and alignment structures 52(2), 52(4), 52(6), each satellites around pins 56. Moreover, the respective alignment structures 52(1)-52(6) forming each set are arranged in a substantially triangular configuration on the planar surface 50 with respect to each other. Initially, each of the alignment structures 52(1)-52(6) comprise a 3 by 3 array (not shown) of pins 56. Referring more specifically to FIG. 9, a cavity 54(2) is shown penetrating beneath the planar surface 50 where a pin 56 in the center of alignment structure 52(2) was ground down to form the cavity 54(2), although the pin 56 may also have been etched away or broken off and may instead have been ground down to the point of being substantially flush with the planar surface 50. In this particular embodiment, the cavity 54(2) penetrates beneath the planar surface 50 from about 80 to 160 μm. The diameters of two pins 56 in alignment structure 52(2) are truncated about 5 μm widthwise using a photolithographic process to form truncated alignment pins 60(1)-60(2). In this embodiment, alignment structures 52(1), 52(3)-52(6) are formed in the same manner as described above with respect to alignment structure 52(2).

Reservoir Structure

Figure 10:
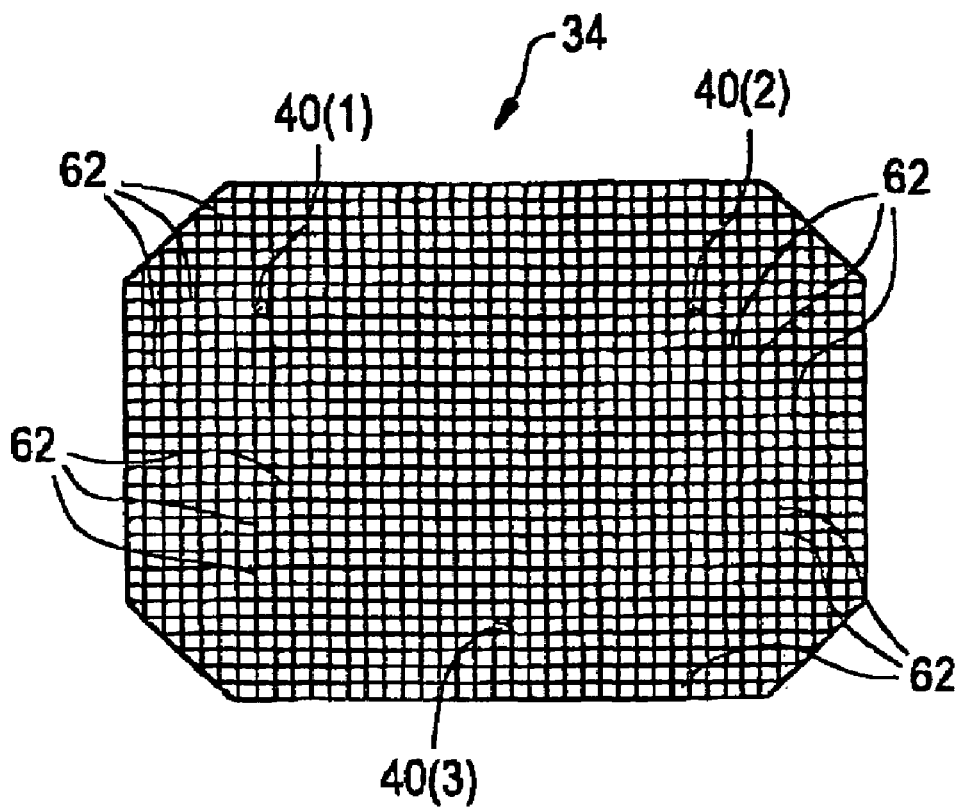
FIG. 10 is a top view of the reservoir structure with alignment balls attached.
Figure 11:
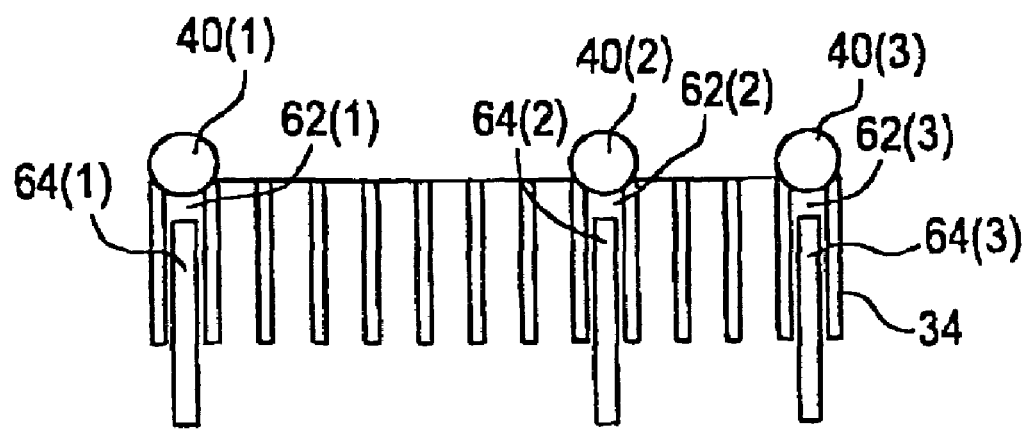
FIG. 11 is a side cross-sectional view of a process for attaching alignment balls to the reservoir structure surface in accordance another embodiment.

Referring generally to FIGS. 10-11, the reservoir structure 34 of HDA print head system 30 will now be described in accordance with another embodiment of the present invention. The top surface of reservoir structure 34 comprises a plurality of capillaries 62 and balls 40(1)-40(3), each capable of holding the same or different liquid materials 99 by utilizing capillary forces. Capillaries 62 are vertical, hollow and have a substantially conical shape where each one becomes narrower from the base of the reservoir structure 34 as it approaches the top surface of the reservoir structure 34. In this embodiment, balls 40(1)-40(3) are stainless steel and have a diameter of approximately 400 μm, although balls 40(1)-40(3) may comprise various objects' such as spheres, orbs or have a substantially square shape, for example. Moreover, the diameters of balls 40(1)-40(3) may range from 300 μm to 500 μm.

Referring to FIG. 11, three balls 40(1)-40(3) are connected to the top surface of reservoir structure 34 using magnetic wires 64(1)-64(3), although a lesser or greater number of balls 40(1)-40(3) may be used. In this embodiment, magnetic wires 64(1)-64(3) comprise Nickel Cobalt wire having a diameter of approximately 150 μm and a length of approximately 130 mm, although magnetic wires 64(1)-64(3) may be modified with respect to the materials, diameter, or length so long as their insertion will not damage the capillaries 62(1)-62(3).

Magnetic wires 64(1)-64(3) are inserted at the base of reservoir structure 34 through the large extremity of each capillary 62(1)-62(3) designated to receive one of balls 40(1)-

40(3). Capillaries are designated on the pin plate mask database. The magnetic wires 64(1)-64(3) are inserted until they extend approximately 12 mm above the top surface of reservoir structure 34. Between 100 to 150 pl of UV curable adhesive (e.g., ref. LCR000V from ICI) is deposited on the end of the magnetic wires 64(1)-64(3) extending above the top surface of reservoir structure 34, although other types of adhesives may be used.

Balls 40(1)-40(3) are placed on the adhesive end of the magnetic wires 64(1)-64(3) thereby moistening the lower portion of each ball 40(1)-40(3) contacting the corresponding magnetic wires 64(1)-64(3) while not contaminating the upper portion of each ball 40(1)-40(3). Magnetic wires 64(1)-64(3) are removed from each capillary 62(1)-62(3) in the opposite direction they were inserted in. As a result, balls 40(1)-40(3) are deposed in a substantial center of the openings to capillaries 62(1)-62(3). The magnetic attraction between balls 40(1)-40(3) and magnetic wires 64(1)-64(3) assists in ensuring that balls 40(1)-40(3) remain placed on magnetic wires 64(1)-64(3) during this attachment process. Moreover, the surface tension of the adhesive aids in centering balls 40(1)-40(3) in the opening to capillaries 62(1)-62(3). In addition, the magnetic attraction between balls 40(1)-40(3) and magnetic wires 64(1)-64(3) aids in aligning the central axis of balls 40(1)-40(3) with the central axis of capillaries 62(1)-62(3). As balls 40(1)-40(3) are centered on the opening of capillaries 62(1)-62(3), the adhesive is cured under 120 mW/cm$^2$ of UV light for approximately one minute to secure them in place, although other curing processes may be employed.

Pin Plate Alignment

Figure 12:
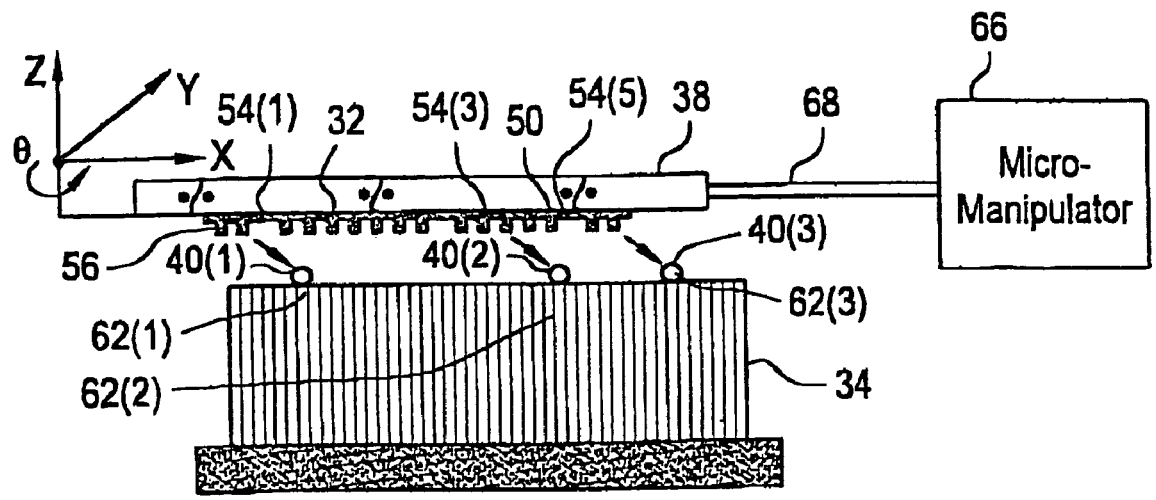
FIG. 12 is a partial side cross-sectional view of the pin plate alignment process using alignment balls and alignment structures in accordance with another embodiment.

Referring generally to FIGS. 6, 8-10 and 12-13, a process for aligning pin plate 32 with respect to reservoir structure 34 in accordance with another embodiment of the present invention will now be described. Although not shown here, pin plate 32 and reservoir structure 34 are situated within the HDA print head system 30. Referring to FIG. 12, a micromanipulator 66 is connected to HDA print head system 30 at the flexure 38 by micromanipulator shaft 68, and hence pin plate 32, prior, during or subsequent to attaching balls 40(1)-40(3) to reservoir structure 34 as described above. The micromanipulator shaft 68 enables the micromanipulator 66 to cause pin plate 32 to be moved as described further herein. In this embodiment, the micromanipulator 66 comprises any type of manual or electrical device such as a Micro Positioner (Quarter Research & Development) that is capable of moving and/or positioning, hereinafter referred to as "moving," pin plate 32 along the X, Y and Z axis or the θ radius, although the micromanipulator 66 may be capable of moving pin plate 32 in other directions such as an α or β axis. Since devices such as micromanipulator 66 and its operation are well known in the art, it will not be described in detail here.

Initially, the micromanipulator 66 moves pin plate 32 above reservoir structure 34 and along one or more of the X, Y and Z axis and the θ radius until each cavity 54(1), 54(3), 54(5) of alignment structures 52(1), 52(3), 52(5) on plan pin plate 32 facing reservoir structure 34 visually appears to be positioned roughly above each corresponding ball 40(1)-40(3). Roughly above is defined as being the central axis of each cavity 54(1), 54(3), 54(5) coinciding with the central axis of each ball 40(1)-40(3). Next, pin plate 32 is moved in a downward direction along the Z axis towards to the top surface of reservoir structure 34. As pin plate 32 approaches reservoir structure 34, each ball 40(1)-40(3) enters each corresponding cavity 54(1), 54(3), 54(5).

Figure 13:
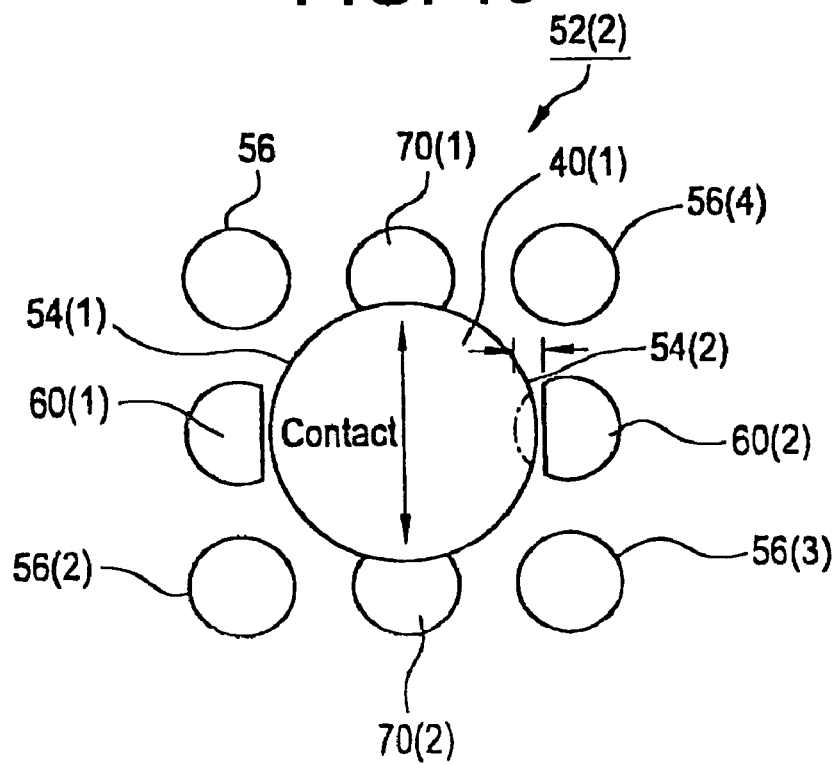
FIG. 13 is a diagram of an alignment ball locating an alignment structure.

Referring to FIG. 13, ball 40(1) is shown entering cavity 54(1). Ball 40(1) makes contact with at least one corresponding alignment pin 70(1)-70(2) immediately adjacent to cavity 54(1). However, ball 40(1) does not make contact with truncated pins 60(1)-60(2) in this particular embodiment although it may in others. Balls 40(2)-40(3) each enter corresponding cavities 54(3), 54(5) in the same manner as described above with respect to ball 40(1). The above-described alignment process results in an accurate alignment of pin plate 32 with respect to the X, Y, α and β axis and the θ radius.

Pin Plate Alignment Assembly

Figure 14:
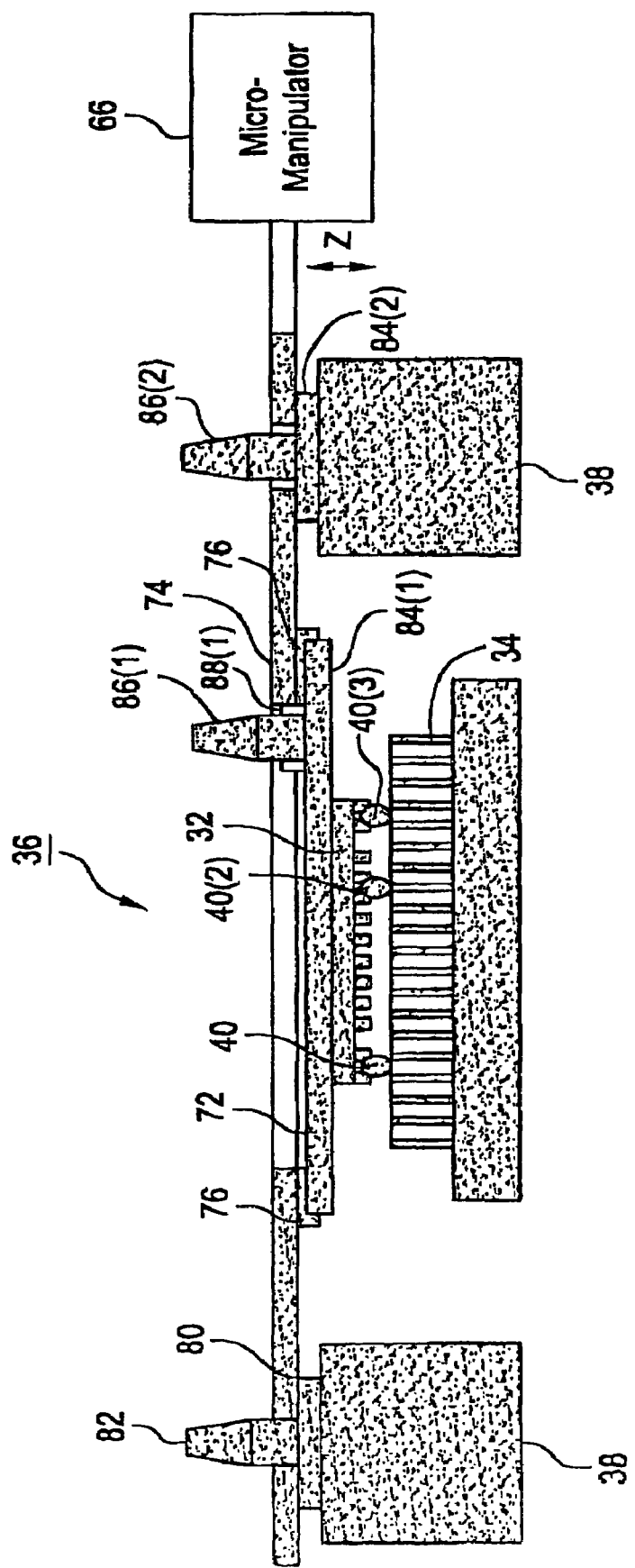
FIG. 14 is a cross-sectional front view of an aligned pin plate assembly usable in the print head system in accordance with another embodiment.

Referring generally to FIGS. 6 and 14, the aligned pin plate assembly 36 of HDA print head system 30 will now be described in accordance with another embodiment of the present invention. Referring to FIG. 14, the plate assembly 36 in this embodiment includes pin plate 32, pin plate base 72 and pin plate support 74 for enabling HDA print head system 30 to perform precise inking and printing operations without requiring further alignment during operation. Pin plate 32 is connected to base 72 by an adhesive, although screws or rivets may be used as well. Base 72 is connected to support 74 by pin plate adhesive 76, which is an ICI charged adhesive (e.g., Ref: LCR050V UV) that shrinks very little when it is cured, although screws or rivets may be used as well. Alternatively, pin plate 32 may be connected directly to support 74 by pin plate adhesive 76. Additionally, a number of materials may be used to form the structures of plate assembly 36 (e.g., base 72 and support 74) including plastic, metal or wood. In this embodiment, the flexure 38 of HDA print head system 30 further comprises centering dowel pad 80, centering dowel 82, locating dowel pads 84(1)-84(2) and locating dowels 86(1)-86(2). The flexure 38 in this embodiment enables the plate assembly 36 to be prepared as described and illustrated herein.

Next, a process for preparing plate assembly 36 will now be described in accordance with another embodiment. Support 74 is placed onto the flexure 38, making contact with the flexure 38 and resting on the centering dowel pad 80 surrounding centering dowel 82 and on the locating dowel pads 84(1)-84(2) surrounding locating dowels 86(1)-86(2). It should be noted that locating dowel pad 84(1) is not shown since it is covered by the base 72. In this embodiment, the plate assembly 36 is held in place on flexure 38 by its weight, although plate assembly 36 may be held in place by magnetic attraction between the support 74 and the centering dowel pad 80 and locating dowel pads 84(1)-84(2). As a result, plate assembly 36 may be conveniently and quickly removed from flexure 38 as necessary without needing special tools. Pin plate adhesive 76 is deposited on a surface of support 74 facing the reservoir structure 34, although pin plate adhesive 76 may be deposited on a top surface of base 72 facing support 74. The micromanipulator 66 is connected to HDA print head system 30 as described above, if it is not already connected, to enable it to cause flexure 38 to flex for lowering support 74 down along the Z axis towards a pin plate 32, which has been aligned as described above and is resting on the top surface of reservoir structure 34, until the support 74 makes contact with the top surface of the base 72.

Next, support 74 is held in place until the pin plate adhesive 76 cures. In this particular embodiment, pin plate adhesive 76 is cured for approximately one minute at 120 mW/cm$^2$, although other curing processes may be employed. When pin plate adhesive 76 cures pin plate 32 is securely connected to support 74. A plurality of plate assemblies 36 are prepared as described above prior to performing inking and printing processes. In this embodiment, ten plate assemblies 36 are prepared, although a lesser or greater number may be prepared. Each plate assembly 36 ensures its respective pin plate 32 remains aligned with respect to reservoir structure 34 and travels along substantially the same X, Y, α and β axis and θ radius throughout subsequent inking and printing operations in a very simple and repeatable process. Repeatability during inking and printing operations ranging from 2 to 3 μm along the X and Y axis, and between 0° and 2° along the α and β axis and the θ radius is achieved using plate assemblies 36.

Fluid Validation

After one or more plate assemblies 36 have been prepared, a fluid validation process is performed. The fluid validation process is performed before attempting to perform inking and printing operations using the actual liquid materials 22 to ensure that pin plates 32 will perform accurate inking and printing operations. The fluid validation process begins by removing balls 40(1)-40(3) from reservoir structure 34. A magnet may be used to dislodge and remove the balls 40(1)-40(3) from reservoir structure 34. Once the balls 40(1)-40(3) are removed, and the slides 24 are aligned with respect to pin plate 32 as described herein, the fluid validation process can proceed by performing inking and printing operations using an inexpensive, suitable material in place of liquid materials 22. Capillaries 62 in reservoir structure 34 are filled with approximately 6 μl of a 1:4 part Ethylene Glycol/water solution, and an inking and printing test run is performed.

Once the fluid validation process is complete and plate assemblies 36 have been verified as being able to perform accurate inking and printing operations, plate assemblies 36 are now ready to be used for performing inking and printing operations using the actual liquid materials 22. The Ethylene Glycol/water solution is removed from the reservoir structure 34, although reservoir structure 34 may be replaced by another reservoir structure 34 filled with the liquid materials 22.

Alignment of Printing Slides with Respect to Pin Plate

Figure 15:
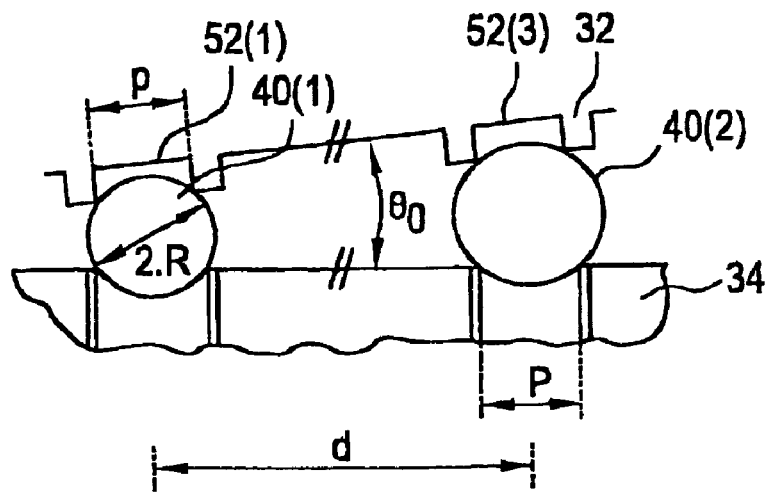
FIG. 15 is a partial cross-sectional diagram of the remaining misalignment between an aligned pin plate and a reservoir structure.

Referring generally to FIGS. 15-22, systems for aligning and maintaining alignment of slides 24 with respect to pin plates 32 will now be described in accordance with one or more embodiments of the present invention. Referring to FIG. 15, the parallelism between each pin plate 32 with respect to reservoir structure 34 can be expressed as a value by solving the following equation for $\theta_o$:

$$\theta_0 = \text{Arc} \tan \left( \frac{\frac{R \cdot \Delta R + \frac{P}{4} \cdot \Delta P}{\sqrt{R^2 - \left(\frac{P}{2}\right)^2}} + \frac{R \cdot \Delta R + \frac{p}{4} \cdot \Delta p}{\sqrt{R^2 - \left(\frac{p}{2}\right)^2}}}{d} \right)$$

Thus, for example, where d=8.0 mm, p=117 μm±5 μm, P=185 82 m±3 μm and R=198.5 μm±0.2 μm, $\theta_o$=0.25 mrd, for example.

In particular, $\theta_o$ represents the degree of any remaining misalignment between pin plate 32 in an aligned pin plate assembly 36 with respect to reservoir structure 34 after the above-described alignment processes have been performed. Such remaining misalignments may result from differences in the sizes of balls 40(1)-40(3) or human error when inspecting cavities 52(1), 52(3) to determine whether they are positioned roughly above each corresponding ball 40(1), 40(2) on the top surface of reservoir structure 34 during the alignment process described above in connection with FIGS. 6, 8-10 and 12-13.

Figure 16:
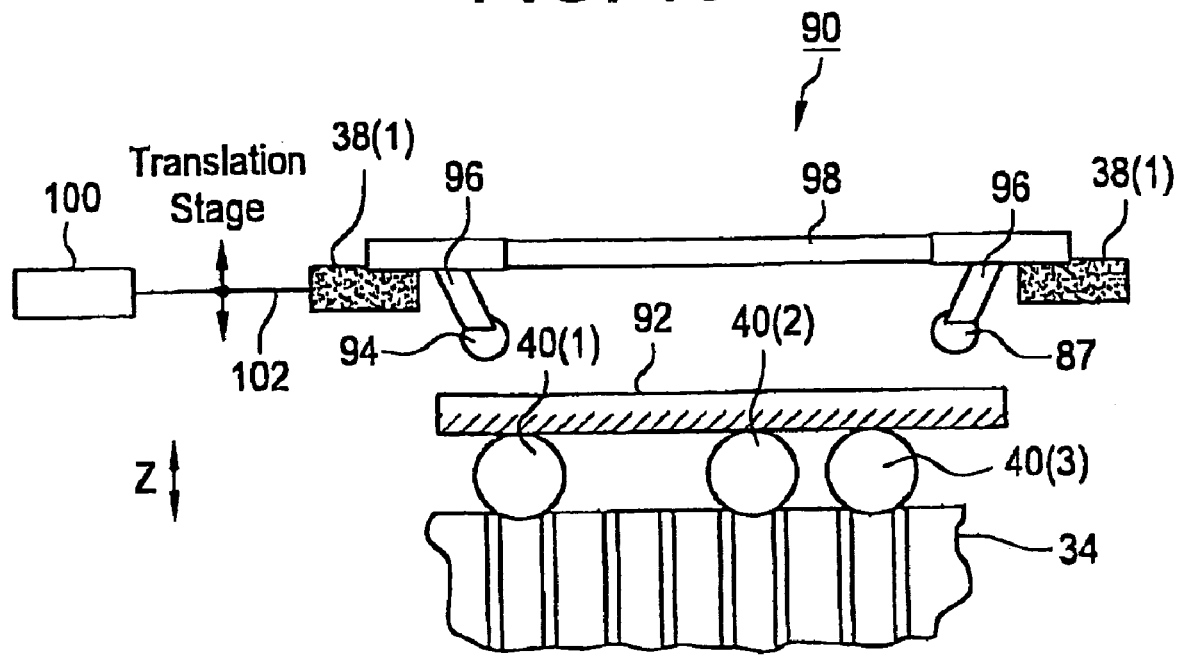
FIG. 16 is a cross-sectional front view of a slide alignment assembly in accordance with another embodiment.

Referring to FIG. 16, a slide alignment assembly 90 that may be used to record the parallelism formed by the plane of the combined top surfaces of balls 40(1)-40(3) will now be described in accordance with one embodiment. In this embodiment, slide alignment assembly 90 includes mirror plate 92, support extensions 96, mirror plate support 98 and translation stage 100. The translation stage 100 is connected to the flexure 38 by a translation stage shaft 102. The translation stage 100 is the same type of device as the micromanipulator 66 described above with respect to FIG. 12 and is capable of moving the flexure 38(1) upwards and downwards along the Z axis. Since the translation stage 100 is the same as micromanipulator 66, it will not be described in detail here. [The translation stage is a precision ball screw activated by a stepper motor, moving up and down the flexure arm through a precision.

A process for preparing the slide alignment assembly 90 will now be described. The mirror plate support 98 is placed on flexure 38(1). Next, the mirror plate 92 is placed across the top surfaces of balls 40(1)-40(3), although the mirror plate 92 may be placed on balls 40(1)-40(3) prior to placing mirror plate support 98 on flexure 38(1). Mirror support adhesive 94 is placed on the ends of mirror support extensions 96 facing mirror plate 92. Next, the translation stage 100 moves the mirror plate support 98 downwards along the Z axis towards mirror plate 92 until the adhesive ends of mirror support extensions 96 make contact with the top surface of the mirror plate 92. Mirror support adhesive 94 is cured as described above in one or more embodiments to thereby secure mirror plate 92 to mirror plate support 98 by way of mirror support extensions 96. The mirror plate support 98 now has a substantially identical orientation with respect to the X, Y, Z, α and β axis and θ radius as the plane formed by the combined top surfaces of balls 40(1)-40(3).

Figure 17:
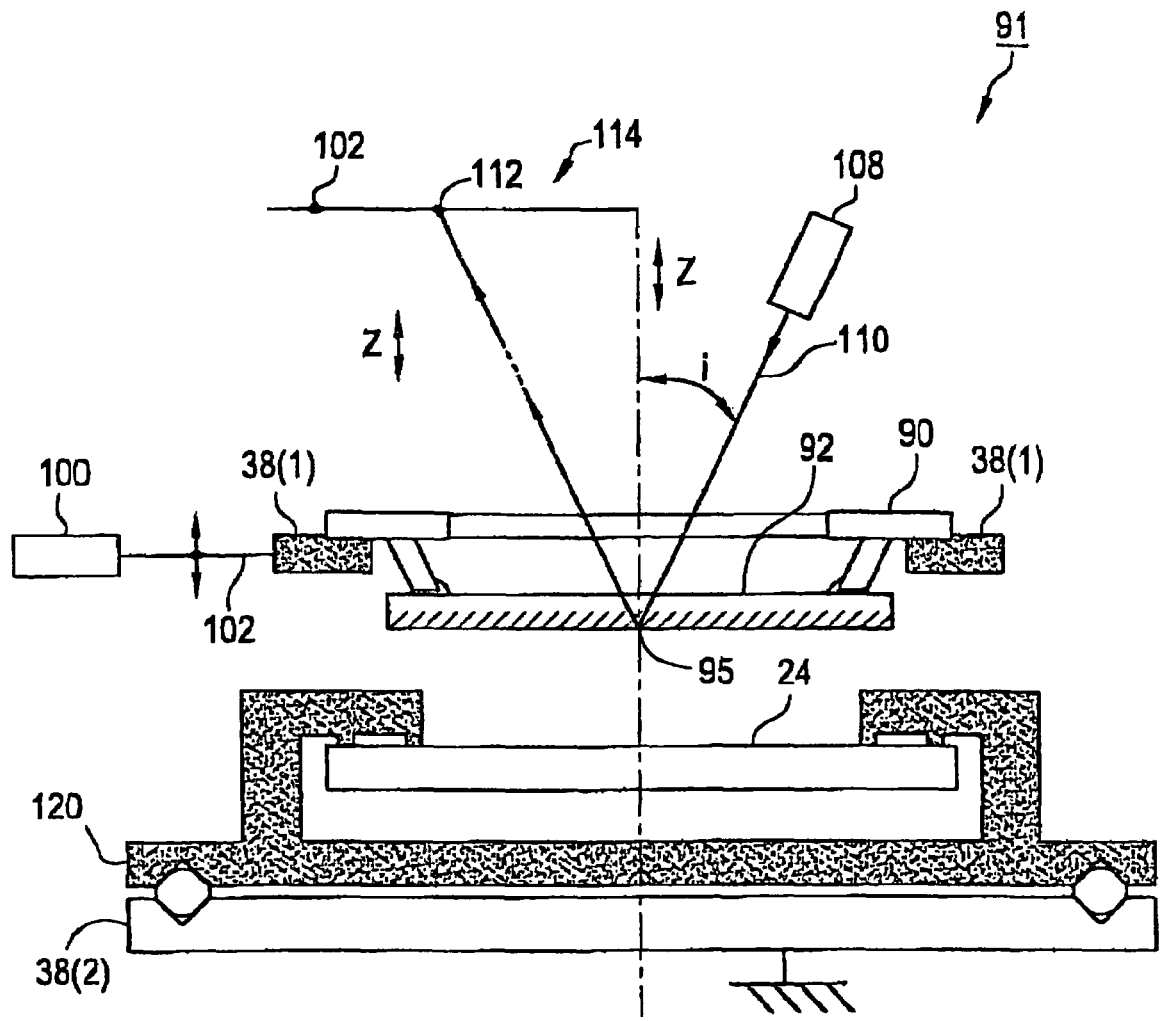
FIG. 17 is a cross-sectional front view of a misalignment recording system using the slide alignment assembly of FIG. 16.

Referring to FIG. 17, a misalignment recording system 91 that uses the slide alignment assembly 90 to create a reference point 112 for recording the parallelism formed by the plane of the combined top surfaces of balls 40(1)-40(3) will now be described in accordance with another embodiment. In this embodiment, the misalignment recording system 91 includes the slide alignment assembly 90, mirror plate 92 and translation stage 100 described above. Misalignment recording system 91 further includes a laser diode 108, which may be attached to a ceiling 114 and positioned above the slide alignment assembly 90 so that the laser diode 108 has a clear line of sight with respect to a reflective surface of the mirror plate 92. In this embodiment, the laser diode 108 is any type of He—Ne laser generating device capable of generating laser beams 110 with a divergence of approximately 0.3 mrd, although other divergence values and laser generating devices may be used. Since devices such as laser diode 108 and their operation are well known in the art it will not be described in detail here.

A process for using misalignment recording system 91 to record a reference point 112 representing the parallelism of the combined top surfaces of balls 40(1)-40(3) will now be described. Translation stage 100 moves the slide alignment assembly 90 upwards along the Z axis, hence raising mirror plate 92 away from its resting position on the top surface of balls 40(1)-40(3). The slide alignment assembly 90 is moved upwards to provide ample clearance in HDA print head system 30 for connecting a slide support 120 to the flexure 38(2) for moving and holding a slide 24, for example, which will be described in further detail herein below. Next, laser diode 108 generates a laser beam 110 that travels a total of approximately 2 meters to a point on the ceiling 114 in this example. In particular, the laser beam 110 is directed towards a random point 95 on the reflective surface of the mirror plate 92. The laser beam 110 reflects off the mirror plate 92 towards a point on the ceiling 114. In this example, laser beam 110 is reflected to create a burn mark, for example, on the ceiling 114 at reference point 112. A special material such as a photosensitive paper may be used to cover the ceiling 114 to prevent laser beam 110 from causing damage and to readily indicate reference point 112. The parallelism formed by the plane of the combined top surfaces of balls 40(1)-40(3) has now been recorded at reference point 112.

Even though the parallelism of the combined top surfaces of balls 40(1)-40(3) with respect to the mirror plate 92 has been determined and recorded at reference point 112, there is typically a discrepancy between the degree of residual misalignment of pin plate 32 with respect to reservoir structure 34 (i.e., $\theta_o$) and the degree of residual misalignment of mirror plate 82 with respect to reservoir structure 34.

Figure 18:
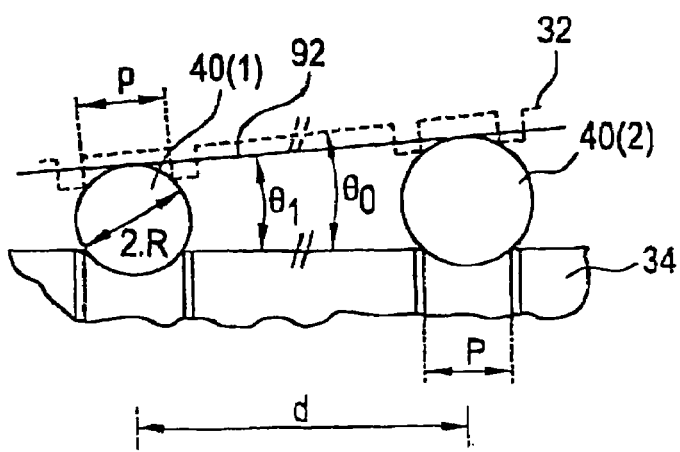
FIG. 18 is a partial cross-sectional diagram of a remaining misalignment between an aligned pin plate, a mirror plate and a reservoir structure.

Referring to FIG. 18, the parallelism between the mirror plate 92 with respect to reservoir structure 34 can be expressed as a value by solving the following equation for $\theta_1$:

$$\theta_1 = \text{Arc}\tan\left(\frac{\frac{R \cdot \Delta R + \frac{P}{4} \cdot \Delta P}{\sqrt{R^2 - \left(\frac{P}{2}\right)^2}} + \Delta R}{d}\right)$$

Thus, for example, where d=8.0 mm, P=185 µm±3 µm and R=198.5 µm±0.2 µm, $\theta_1$=0.15 mrd.

Thus, the residual parallelism angle error remaining between pin plate 32 with respect to reservoir structure 34 and mirror plate 82 with respect to reservoir structure 34 can be calculated and expressed as $|\theta_o-\theta_1|$. Therefore, substituting the values calculated above for $\theta_o$ and $\theta_1$ in $|\theta_o-\theta_1|$, the residual parallelism angle error is calculated to be 0.10 mrd. The 0.10 mrd of residual parallelism angle error corresponds to the 0.0-0.7 µm differences in length among each of the pins 56 (FIG. 8). The residual parallelism angle error in this example is no greater than the differences in length among each of the pins 56 and thus falls within acceptable tolerances and validates the recording of the misalignment recording system 91.

Figure 19:
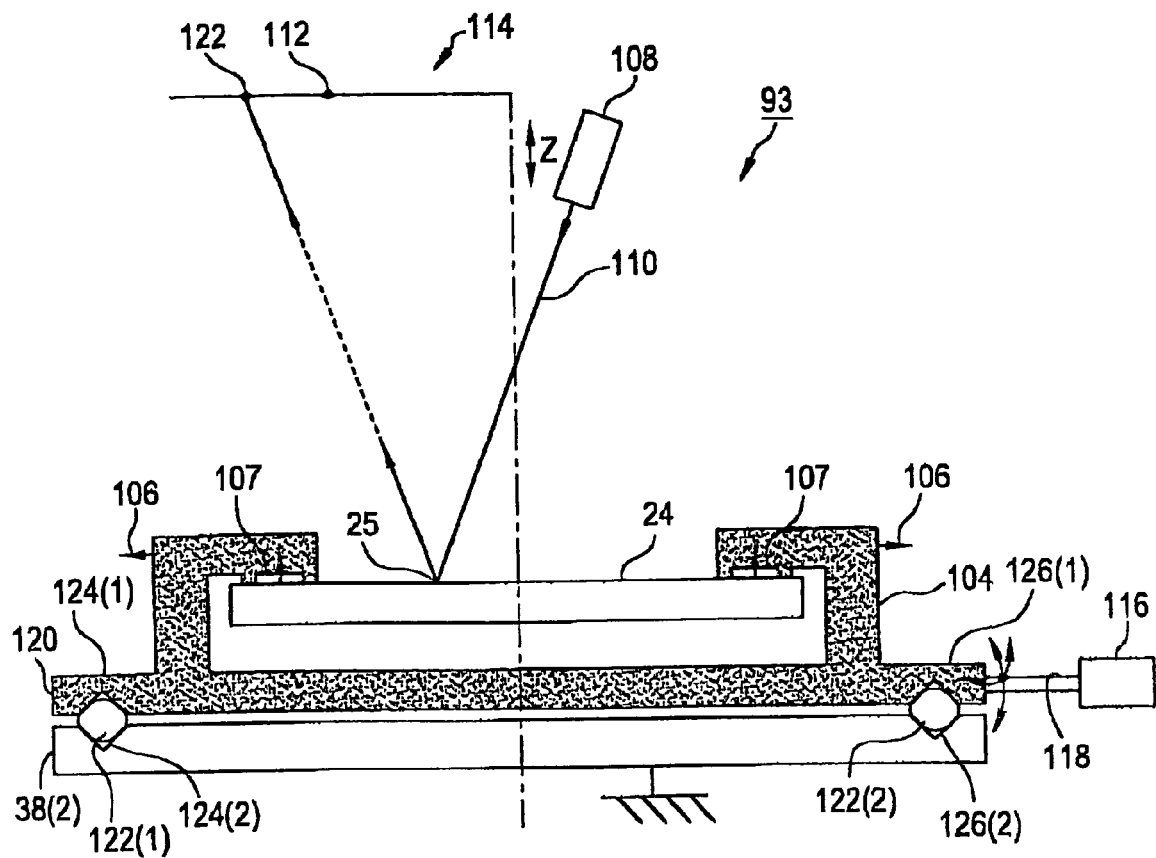
FIG. 19 is a cross-sectional front view of a slide alignment system in accordance with another embodiment.

Referring to FIG. 19, a slide alignment system 93 that uses the reference point 112 as a guide for minimizing the degree of residual misalignment of slides 24 with respect to pin plates 32 will now be described in accordance with another embodiment. In this embodiment, slide alignment system 93 includes a slide 24, laser diode 108, vacuum bridge 104, slide support orientation mechanism 116, slide support 120 and support adjustment balls 122(1)-122(2). In this embodiment, slide support 120 is connected to flexure 38(2) and vacuum bridge 104. Slide support 120 includes two spring loaded precision screws (not shown) that may be manually tightened or loosened to adjust the orientation of slide support 120 with respect to the α and β axis, for example, to align slide 24 with respect to pin plate 32, although slide support 120 may also adjust the orientation of slide support 120 with respect to other axis or radiuses.

In this embodiment, each one of the screws are positioned to make contact with adjustment balls 122(1)-122(2). Adjustment ball 122(1) adjusts the orientation of slide support 120 with respect to the a axis, and adjustment ball 122(2) adjusts the θ axis as described herein. In this embodiment, the adjustment balls 122(1)-122(2) are elliptical, although the adjustment balls 122(1)-122(2) may have other substantially round shapes so long as the screw rotations cause the adjustment balls 122(1)-122(2) to rotate between the slide support 120 and flexure 38(2). The adjustment balls 122(1)-122(2) are located in α channels 124(1)-124(2) and β channels 126(1)-126(2), respectively, that run horizontally with respect to the flexure 38(2). Moreover, channels 124(1)-124(2) and 126(1)-126(2) are formed to respond to the rotation of adjustment balls 122(1)-122(2), respectively, by changing the orientation of the slide support 120 with respect to the α and β axis, respectively. When slide support 120 achieves a desired orientation as described further herein, it may be locked into a fixed orientation with respect to flexure 38(2). Slide support 120 can be locked using an adhesive and any one of the curing processes described above in one or more embodiments, although slide support 120 may be clamped or fastened to flexure 38(2) and vacuum bridge 104 using screws. Should there be any need to realign slide 24, and hence slide support 120, slide support 120 can be unlocked and readjusted as required by adjusting the two spring loaded precision screws.

The slide support orientation mechanism 116 may be connected to the slide support 120 by the mechanism shaft 118. In particular, the mechanism shaft 118 may be connected to the two spring loaded precision screws for causing the screws to rotate. The orientation mechanism 116 may comprise type of manual or electrical device capable of causing the screws to rotate. Since devices such as orientation mechanism 116 and its operation are well known in the art it will not be described in detail here.

Vacuum bridge 104 is connected to slide support 120 by an adhesive using any one of the curing processes described above in one or more embodiments, although vacuum bridge 104 may be clamped or fastened to slide support 120 using screws. Alternatively, vacuum bridge 104 and slide support 120 may form one integral structure. Vacuum bridge 104 includes vacuum channel inlets 106 and vacuum channel openings 107. Vacuum bridge 104 is also connected to a vacuum generator (not shown) at inlets 106 for receiving vacuum pressure. The vacuum generator (e.g., palette vacuum pump, Venturi) may comprise any type of mechanism that produces sufficient amounts of vacuum pressure in the range of two to four hundred millibars for securing slides 24 at the vacuum channel openings 107 during printing operations, for example.

A process for using slide alignment system 93 to minimize the degree of residual misalignment of slides 24 with respect to pin plates 32 will now be described. Slide support 120 is mounted onto the flexure 38(2) and a slide 24 is inserted in and secured by the vacuum bridge 104 when the vacuum generator is operated. Next, laser diode 108 generates a laser beam 110 towards slide reflection point 25 on slide 24. The laser beam 110 is reflected from the reflection point 25 towards an initial misaligned spot on the ceiling 114. In this embodiment, the laser diode 108 continuously generates a laser beam 110, although in other embodiments laser beam 110 is generated at predetermined time intervals or randomly. Next, the orientation of slide support 120 is adjusted with respect to one or more axis or radiuses. The adjustment causes the laser beam 110 to be reflected onto a different points of ceiling 114. Thus, the adjustment is performed until the laser beam 110 is visually observed to converge upon the reference point 112. In another embodiment, a CCD camera may be used to photograph the laser beam 110 and reference point 112 to more accurately determine when the laser beam 110 converges upon the reference point 112. At that stage, the degree of residual misalignment of slides 24 with respect to pin plates 32 will have been minimized.

Figure 20:
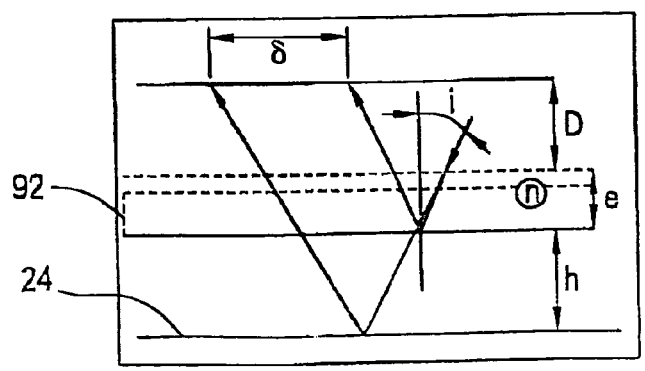
FIG. 20 is a partial cross-sectional diagram of the systematic error caused by the distance between a mirror plate and a slide in the slide alignment system of FIG. 19.

Referring now to FIG. 20, it should be noted that there is systematic error, however, due to the distance h between the reflective surface of mirror plate 92 and the top surface of slide 24. The remaining error can be calculated by solving the following equation:

$$\delta = 2 \cdot (e + h) \tan(i) - 2 \cdot e \cdot \tan\left(\text{Arc}\sin\left(\frac{\sin(i)}{n}\right)\right)$$

Thus, for example, where D=2 m, n=1.5_[Please insert the correct unit], e=1.0 mm, h=0.05 mm and i=15°, δ=0.21 mm.

In this example, the systematic error (i.e., 0.21 mm) corresponds to a slide 24 having a residual parallelism angle error of 0.11 mrd, which is within a range of tolerance for misalignments between pin plates 32 with respect to reservoir structure 34 (i.e., 0.25 mrd). Nevertheless, the systematic error is expected and accounted for by the present invention by reducing the distance h as much as possible during the misalignment minimization process described above with respect to FIGS. 17 and 19.

Figure 21:
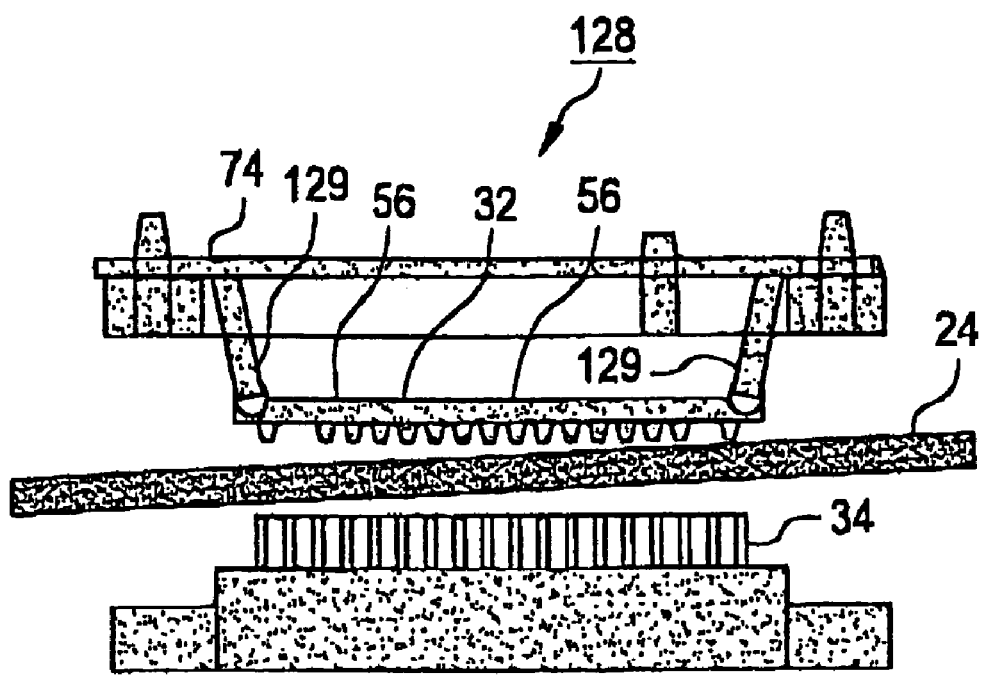
FIG. 21 is a cross-sectional side view of a detachable self aligning pin plate assembly having a misaligned slide during a printing operation in accordance with another embodiment.
Figure 22:
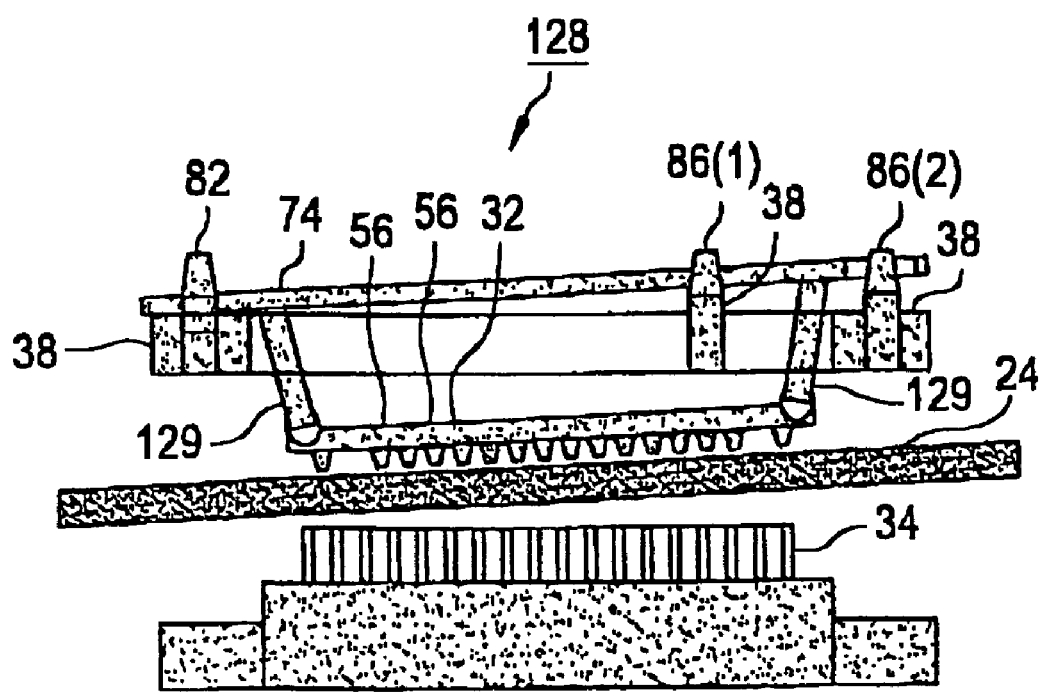
FIG. 22 is a cross-sectional side view of the pin plate assembly in FIG. 21 detaching from the flexure to adapt to the misaligned slide.

Referring generally to FIGS. 21-22, a detachable pin plate assembly system 130 for maintaining alignment between slides 24 and pin plates 32 during printing operations in accordance with another embodiment of the present invention will now be described. Referring to FIG. 21, detachable assembly system 128 is the same as the aligned pin plate assembly 36 described above earlier, except that detachable assembly system 128 includes pin plate 32 being connected to pin plate support 74 by way of pin plate extensions 129.

During printing, slide 24 may become misaligned with respect to pin plate 32 as shown. As mentioned above, misalignments can cause severe damage to the pins 56 of pin plate 32 and/or slide 24. Referring to FIG. 22, detachable assembly system 128 is able to adapt its orientation during printing in the event slide 24 is not positioned substantially parallel to pin plate 32. In this example, detachable assembly system 128 detaches from flexure 38 by lifting up at the locating dowels 86(1)-86(2), although detachable assembly system 128 may also lift up at the centering dowel 82. Moreover, detachable assembly system 128 may rotate slightly on flexure 38 as necessary to remain aligned with slide 24. Centering dowel 82 and/or locating dowels 86(1)-86(2) may have sufficient magnetic properties to attract the detachable assembly system 128 to prevent it from completely detaching from the flexure 38. Further, stoppers (not shown) may be connected to the ends of Centering dowel 82 and/or locating dowels 86(1)-86 (2) to prevent detachable assembly system 128 from completely detaching from the flexure 38.

Having thus described the basic concept of the invention, it will be rather apparent to those skilled in the art that the foregoing detailed disclosure is intended to be presented by way of example only, and is not limiting. Various alternations, improvements, and modifications will occur and are intended to those skilled in the art, though not expressly stated herein. These alterations, improvements, and modifications are intended to be suggested hereby, and are within the spirit and scope of the invention. Further, the recited order of processing elements or sequences or the use of numbers, letters, or other designations therefor, is not intended to limit the claimed processes to any order except as may be specified in the claims and equivalents thereto.

What is claimed is:

1. A method for aligning a pin plate with respect to a reservoir, the method comprising:
   providing the pin plate with a plurality of object receptacles on a surface of the pin plate;
   placing a plurality of objects on a surface of the reservoir;
   positioning the pin plate with respect to the reservoir such that each of the objects is located at least partially within one of the object receptacles; and
   securing the pin plate to a supporting assembly.

2. The method as set forth in claim 1 wherein each of the object receptacles comprises an alignment structure projecting outwardly and away from the surface of the pin plate, each of the alignment structures defining one of the object receptacles.

3. The method as set forth in claim 2 wherein each of the alignment structures comprises a plurality of extensions which are located on the surface of the pin plate to define one of the object receptacles.

4. The method as set forth in claim 1 wherein there are three of the object receptacles and three of the objects and each of the object receptacles is located in a substantially triangular configuration on the surface of the pin plate.

5. The method as set forth in claim 1 wherein there are six of the object receptacles located around and adjacent to sides of the pin plate.

6. The method as set forth in claim 1 wherein each of the objects is a ball.

7. The method as set forth in claim 1 wherein the placing of the plurality of objects further comprises:
   inserting a protrusion through a capillary in the reservoir, one end of the protrusion extending out away from the surface of the reservoir and at least the one end of the protrusion being magnetized;
   magnetically coupling one of the objects to the one end of the protrusion; and
   removing the protrusion from the capillary to deposit the object in an opening to the capillary.

8. The method as set forth in claim 7 further comprises:
   placing an adhesive on the one end of the protrusion; and
   curing the adhesive when the object is on the opening of the capillary.

9. The method as set forth in claim 1 further comprising:
   lifting the pin plate off of the objects on the surface of the reservoir after the pin plate is secured to the supporting assembly; and
   removing the plurality of objects on the surface of the reservoir after the pin plate is secured to the supporting assembly.

* * * * *

UNITED STATES PATENT AND TRADEMARK OFFICE
CERTIFICATE OF CORRECTION

PATENT NO. : 7,434,513 B2  
APPLICATION NO. : 10/848878  
DATED : October 14, 2008  
INVENTOR(S) : Thierry L. A. Dannoux et al.

Page 1 of 1

It is certified that error appears in the above-identified patent and that said Letters Patent is hereby corrected as shown below:

Col. 8, line 44, Please delete "99" and replace with "22".
Col. 9, line 58, Please delete "plan" and replace with "planar surface 50 of pin".

Signed and Sealed this

Twenty-fourth Day of March, 2009

JOHN DOLL
*Acting Director of the United States Patent and Trademark Office*